United States Patent [19]

Rabus et al.

[11] 3,866,979
[45] Feb. 18, 1975

[54] FAIL SAFE VEHICLE WHEEL BRAKING ANTI-LOCK SYSTEM

[75] Inventors: Friedrich Rabus, Schwieberidingen; Bernd Peter, Kornwestheim; Hermann Eisele, Ditzingen, all of Germany

[73] Assignee: Robert Bosch GmbH, Gerlingen, Germany

[22] Filed: June 4, 1973

[21] Appl. No.: 366,691

[30] Foreign Application Priority Data
June 9, 1972 Germany.............................. 2228104

[52] U.S. Cl. ....... 303/21 AF, 188/181 A, 303/21 P, 340/52 B
[51] Int. Cl. ............................................. B60t 8/12
[58] Field of Search ..... 180/82 R; 188/188; 303/20, 303/21; 317/5; 324/161–162, 73 R; 340/52 B, 53, 262–263

[56] References Cited
UNITED STATES PATENTS

| | | | |
|---|---|---|---|
| 3,540,781 | 11/1970 | Okamoto et al. | 303/21 BE |
| 3,578,819 | 5/1971 | Atkins | 303/21 BE |
| 3,606,491 | 9/1971 | Walsh | 303/21 AF |
| 3,734,573 | 5/1973 | Davis et al. | 303/21 AF X |
| 3,744,851 | 7/1973 | Burckhardt et al. | 303/21 BE |
| 3,759,582 | 9/1973 | Ohta et al. | 303/21 AF |

*Primary Examiner*—Trygve M. Blix
*Assistant Examiner*—Stephen G. Kunin
*Attorney, Agent, or Firm*—Flynn & Frishauf

[57] ABSTRACT

To relieve brake fluid pressure applied to a vehicle wheel brake which has an anti-lock system, and to prevent excessive drainage of brake fluid upon malfunction of the electrical system, a timing circuit is included in the electrical anti-lock system to prevent drainage of brake fluid for a period of time exceeding a predetermined timing period, so that, regardless of absence of a re-set signal permitting recovery of braking control by the operator, the automatic anti-lock system will prevent drop in braking pressure over an excessive period of time.

16 Claims, 6 Drawing Figures

FAIL SAFE VEHICLE WHEEL BRAKING ANTI-LOCK SYSTEM

CROSS REFERENCE TO RELATED APPLICATIONS

U.S. Ser. No. 330,674, filed Feb. 8, 1973; U.S. Ser. No. 328,047, filed Jan. 30, 1973; U.S. Ser. No. 328,569, filed Jan. 22, 1973.

The present invention relates to a vehicle wheel brake anti-lock system, and more particularly to an electrically controlled anti-lock system in which the pressure built up due to operator control in the brake of a wheel cylinder is relieved in accordance with wheel operation. Specifically, and as set forth for example in the cross referenced applications, wheel speed is measured by a tachometer generator, and a derivative acceleration (or its negative, deceleration) signal is obtained which is applied to a threshold switch. If a certain threshold is exceeded, a pressure bleeding valve is energized to relieve pressure in the braking system of the wheel.

Vehicle wheel anti-lock systems, as briefly set forth above, are known. To provide a differentiated signal, a circuit is used which includes a differentiating capacitor. Such differentiating capacitors pass electrical pulses which are desired; they also pass noise or stray pulses, however. Noise and stray pulses frequently occur in the electrical system, or are picked up by stray radiation in automotive vehicles, and such differentiating capacitors therefore pass such stray pulses without essential attenuation. A threshold switch connected to the differentiator may be triggered by a noise or stray pulse. This may cause malfunction or erroneous operation of a vehicle wheel anti-lock system. If such a stray pulse is sensed by the vehicle wheel anti-lock system, braking pressure is relieved, even if the braking effort itself has not yet led to locking of the wheel. The system, however, will not supply a re-set pulse for the bleeder valve, since the vehicle wheel would be re-accelerated more strongly only if it had been previously blocked. A stray or error pulse in the electrical system of the vehicle therefore may have the dangerous consequence that normal braking is completely eliminated by drop in braking pressure, which may be the cause of an accident.

It is an object of the present invention to improve vehicle wheel anti-lock systems in which the system can distinguish between drop in braking pressure caused by vehicle wheel locking and drop in braking pressure caused by a spurious or stray pulse. Pressure drops caused by stray pulses are to be terminated at the proper time, so that the braking distance of the vehicle is not essentially increased.

The invention therefore relates to a vehicle wheel anti-lock system in which an electromagnetically operated valve is arranged to bleed braking pressure from the pressure line in a braking system, and more particularly to such a system in which a transistor switch is provided to energize the magnetic solenoid winding of the bleeder valve.

SUBJECT MATTER OF THE PRESENT INVENTION

Briefly, a timing circuit is arranged between the switch supplying the solenoid with current, resulting in bleeding of brake fluid, and the threshold switch; if the threshold switch responds, current to the transistor and hence to the solenoid is enabled and at the same time the timing period of the timing circuit is started. After the timing period or delay period has elapsed, current is interrupted to the solenoid by interrupting energization of the transistor switch, even if no re-set pulse is derived from the threshold switch.

Vehicle wheel anti-lock systems of this type may have a short circuit within the transistor switch, which also would cause constant energization of the magnet winding, resulting in complete loss of braking effort. In accordance with an embodiment of the invention, supply voltage for the bleeder valve solenoid is connected through a switching stage which controls a switch between the transistor and its supply line, and which interrupts current supply to the magnetic valve and to the transistor in any event after a second fixed delay time. Preferably, the switching network includes a warning or alarm circuit, for example having a lamp, to indicate malfunction in the anti-lock system and to provide a warning to the operator that thereafter braking of the wheel must be entirely under operator control.

The invention will be described by way of example with reference to the accompanying drawings, wherein.

Figure 1:
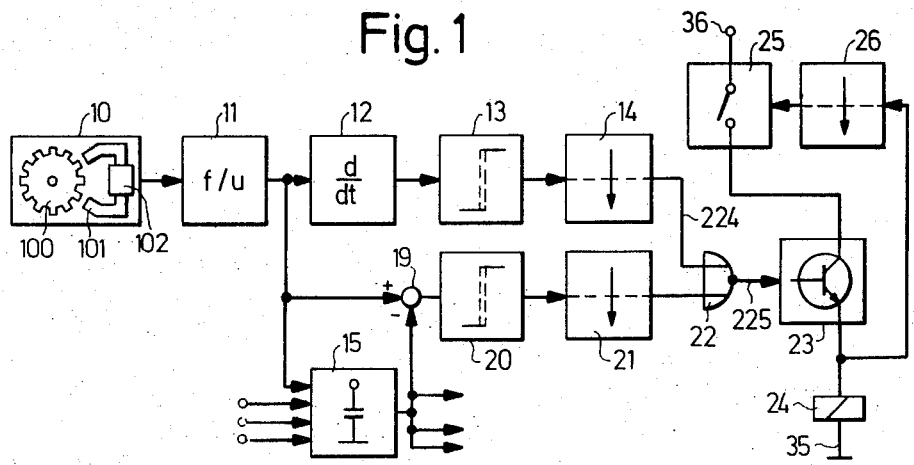
FIG. 1 is an abbreviated, highly schematic block circuit diagram of an embodiment of the present invention.

The invention is applicable to various types of vehicle wheel anti-lock systems, for example to those referred to in the cross referenced applications; only the most basic features of the vehicle wheel anti-lock system, to which the invention is applicable, are reproduced in the present application and will be described. FIG. 1 illustrates a pulse tachometer generator 10 having a toothed or gear wheel 100 with ferromagnetic teeth. Wheel 100 is driven by a vehicle wheel (not shown). The ferromagnetic teeth of the gear 100 are opposed to a yoke 101 having a coil 102 wound thereon. Upon rotation of gear wheel 100, the magnetic reluctance of the path including the yoke 101 and gear 100 changes periodically. Coil 102 provides an output a-c voltage, in form of pulses, the frequency of which is proportional to the speed of the vehicle wheel. Unit 10 thus functions as a pulse-type tachometer generator.

Tachometer generator 10 is connected to a series circuit which includes, in sequence, a pulse-voltage converter 11, a differentiator 12, a first threshold switch 13, and a first timing or delay circuit 14. The frequency-voltage converter (providing a d-c output voltage) is further connected to an input of a vehicle wheel speed simulating stage 15 and to the + input of an adder 19. Further inputs of the vehicle wheel simulation stage 15 are connected to further frequency d-c voltage converters of the other wheels of the vehicle, not shown, and schematically indicated by the connection arrows to element 15. The output of the speed simulating circuit 15 is connected to the − input of the adder 19. The anti-lock circuits of the remaining vehicle wheels have similar adders 19, each one connected with its input to the output of the simulating stage 15, as indicated by the output arrows from element 15. The adder 19 is connected to a series circuit including a second threshold switch 20, and a second timing or delay circuit 21. Adder 19 thus functions as a comparator.

The outputs of the two timing circuits 14, 21 are connected to two inputs of an NOR-gate 22. Its output 225 is connected to the control input of a switch, namely transistor 23. The emitter-collector path of the transistor 23 is connected to a source of positive supply 36 and to ground or chassis connection 35, in series with a switching stage 25 and the solenoid 24 which controls a pressure relief valve in the vehicle wheel braking system, not shown. The connection point or junction between the transistor switch 23 and the solenoid 24 is connected to the input of a fail-safe switching circuit 26. The switching circuit 26 is connected to the control input of the switching element or stage 25.

Figure 2:
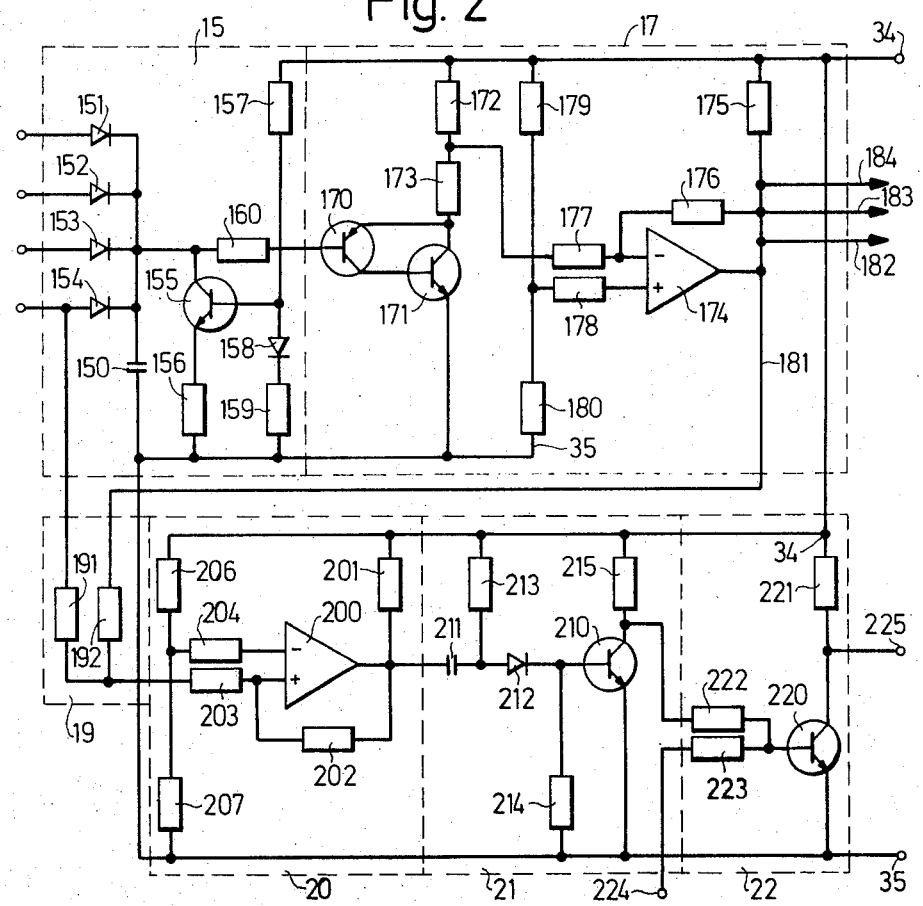
FIG. 2 is a partial schematic circuit diagram of an embodiment of the invention.

Detailed circuit, FIG. 2: Vehicle wheel simulation stage 15 includes a storage capacitor 150, having one terminal connected to chassis bus 35. The second terminal of storage capacitor 150 is connected to a parallel circuit which includes the cathodes of four diodes 151-154. The anodes of the diodes form the inputs to the vehicle wheel simulation stage 15; for example, the anode of diode 154 is connected to the output of the frequency-d-c voltage converter 11 of FIG. 1. A constant current source is connected in parallel to the capacitor 150. The constant current source includes the series circuit of an npn transistor 155 and a resistor 156. The base of transistor 155 is connected to the junction point of a voltage divider formed of resistor 157 on the one hand and to a diode 158 and a resistor 159 on the other. Resistor 157 is connected to a source of stabilized positive supply 34. The storage capacitor 150 is connected on the one hand to chassis or ground 35, and on the other to an output resistor 160.

An inverter circuit 17 is connected to the stage 15; the inverter circuit has been omitted from FIG. 1 for simplicity. The inverter circuit inherently includes an amplifier, and has as its input a complementary Darlington circuit including a pnp transistor 170 and an npn transistor 171. The base of the pnp transistor 170 is connected to the output resistor 160 of stage 15. The emitter of pnp transistor 170 and the collector of the npn transistor 171 are connected together and, over the series circuit including resistors 173, 172 to the stabilized positive supply 34. The collector of the pnp transistor 170 is connected to the base of the npn transistor 171; the emitter of the npn transistor 171 is connected to negative bus 35.

An integrated circuit operational amplifier 174 is connected to the complementary Darlington circuit 170, 171. Its output is connected over a resistor 175 with the positive stabilized supply 34, and over a feedback resistor 176 with the inverting input thereof. The inverting input of operational amplifier 174 is further connected over input resistor 177 to the junction of the two resistors 172, 173 connected to the Darlington circuit. The non-inverting input of operational amplifier 174 is connected to the junction of the voltage divider formed of resistors 179, 180, connected between buses 34, 35 by an input coupling resistor 178. The output of the operational amplifier 134 is connected to four output lines 181-184 which, each, connect to the − inputs of the summing circuits 19 associated with the various individual vehicle wheels. Summing circuit 19 includes two adder resistors 191, 192, one of which being connected to the anode of diode 154 and the other to the respective output from the operational amplifier, in FIG. 2 to output line 181.

The second threshold switch 20 has as its active element an operational amplifier 200, the output of which is connected over a resistor 201 with the stabilized positive supply 34 and over feedback resistor 202 with the non-inverting input of the operational amplifier. The non-inverting input is further connected over input resistor 203 to the common connection of the two adder resistors 191, 192. The inverting input of operational amplifier 200 is connected over input resistor 204 to the tap point of a voltage divider formed of two resistors 206, 207, connected across the stabilized supply 34 and chassis 35.

The second timing circuit 21 uses as its active element an npn transistor 210, having its emitter connected directly to chassis 35 and its collector over resistor 215 to the stabilized supply 34. The base of transistor 210 is connected over resistor 214 to chassis. It is fed over the series circuit of a diode 212 and a capacitor 211 connected to the output of the operational amplifier, the junction between capacitor 211 and diode 212 being connected by resistor 213 to stabilized supply 34.

NOR-gate 22 includes an npn transistor 220 having a collector resistor 221 connected to stabilized supply 34, and its emitter to chassis. Two input resistors 222, 223 are provided, resistor 222 being connected to the collector of the time delay circuit transistor 210 and transistor 223 being connected to an input terminal 224. The input terminal 224 is connected to the output of the first timing circuit 14 (FIG. 1). The collector of transistor 220 forms the output of the NOR-gate at terminal 225.

The two threshold switches 13, 20 (FIG. 1) and the timing circuits 14, 21 are of similar construction, and for a detailed explanation of the circuit of elements 13, 14, reference is made to FIG. 2 and the previous discussion.

Operation: The customary terminology in digital technology will be used, that is, a 1-signal appears at a junction or line when it has approximately the voltage of the stabilized supply 34 and a 0-signal arises when the junction or line is approximately at the voltage of chassis or ground line 35.

An output voltage is derived from circuit 11 which has an amplitude representative of and proportional to speed of the vehicle wheel. In its simplest form, circuit 11 may be a low-pass filter. If there is rapid deceleration of the vehicle wheel, when the wheel is about to lock, the output voltage of differentiator 12 changes in negative direction. At a predetermined value of vehicle deceleration, the threshold of the threshold switch 13 is passed and it provides a 0-signal. When the first timing circuit 14 has a 0-signal applied thereto, a 1-signal will appear at its output which causes the transistor 23 to be energized by connection over NOR-gate 22, thus energizing the bleeder valve solenoid 24, and lowering brake pressure. The braking effort is now gradually decreased, causing increase in acceleration of the vehicle wheel. The threshold switch 13 has a switching hysteresis, that is, the threshold switch 13 responds to change from one to zero upon a deceleration of, for example, 1.5 g and provides a 1-signal when the deceleration drops to 0.5 g, in which g corresponds to free-fall acceleration, about 10 m/s$^2$.

Braking pressure thus decreases in the system of FIG. 1 as soon as the deceleration of the wheel exceeds 1.5 g; bleeding of pressurized brake fluid is terminated when the vehicle wheel deceleration is less than 0.5 g.

Such an on-off control of braking pressure can be obtained by a suitable bleeder valve, previously described.

The switching cycle of the first threshold switch 13 and of the timing circuit 14 is similar to that of the threshold switch 20 and the timing circuit 21.

In addition to the acceleration (deceleration) control by means of braking pressure, a further slip control is provided, which is intended to relieve braking pressure when the vehicle wheel circumferential speed is less than a predermined percentage, for example 80 percent of vehicle speed. Under such condition, braking pressure is relieved even if there is no deceleration derived from differentiator 12. The slip control includes the stages 15, 19, 20 and 21.

Operation of slip control: Automotive vehicles do not have wheels without brakes, which would determine relative vehicle ground speed independently, and therefore the vehicle speed (independently of the wheels) must be determined electronically. This is done in stage 15. A storage capacitor 150 is connected over diodes 151 to 154 to the output voltages of the various tachometer generators associated with the various wheels. The storage capacitor 150 is thus charged to a voltage which is representative of, for example proportional to the circumferential speed of that wheel which rotates fastest. This is necessarily the case because only that diode of the groups of diodes 151 to 154 will be conductive which has the highest voltage at its anode. The storage capacitor stores this highest voltage, and the theory of obtaining actual vehicle speed is based on the fact that that wheel which rotates the fastest has not yet locked, thus has, effectively, rolling contact over the road surface and the voltage is representative of actual vehicle ground speed. It may occur that all vehicle wheels are locked essentially simultaneously, and constant current source 155, 156 is provided for such a case. If all wheels are locked, all diodes 151 to 154 are locked. Storage capacitor 150 is then discharged over transistor 155 with a current which can be determined by means of the division ratio of voltage divider 157, 159. Diode 158 changes the tap voltage of the voltage divider 157, 159 in dependence on ambient conditions (voltage of source 34; ambient temperature) in such direction that the frequency swing of the base-emitter diode section of transistor 155 is compensated.

The discharge current of the constant current source 155, 156 is set for a value which corresponds to a vehicle deceleration of 1.0 g. It has been found from experience that this is optimum deceleration for most common vehicles on dry roads. The storage capacitor 150 is thus always at a voltage which is proportional to vehicle speed. If the road is very slick or slippery, and in an extreme case when all wheels are simultaneously locked, it could occur that storage capacitor 150 discharges more rapidly than the actual decrease in vehicle wheel speed. This does not, however, interfere with operation since in this case the deceleration control by means of differentiator 12 and the first threshold switch 13 reliably responds in order to bleed pressurized brake fluid and cause decrease in braking pressure and braking effort.

Storage capacitor 150 has its output connected over resistor 160 to the inverting amplifier 17, in which the output is first amplified by the complementary Darlington circuit 170, 171, without phase reversal. The voltage amplification of the Darlington circuit should be approximately 1.0, whereas its power amplification is substantially greater. The voltage divider with resistors 172, 173 is provided to adjust for a tolerated wheel slip. If a wheel slip of 20 percent between wheel circumferential speed and vehicle speed is to be tolerated, resistors 172, 173 are so dimensioned that their relative resistance values have the ratio of 80 : 20.

Operational amplifier 174 causes phase reversal of the output signal derived from Darlington circuit 170, 171, and should likewise have a voltage amplification of 1.0. Resistors 176, 177 should therefore have the same resistance value.

The summing circuit 19 has inputs shown at + and −, respectively. The different sign for the inputs is obtained by applying the output voltage to the first adder resistor 191 from the frequency-voltage converter 11 without interposing an inverter stage, but interposing the inverter stage 17 between the output voltage from storage capacitor 150 and the second adder resistor 192. The non-inverting input of operational amplifier 200 therefore has a voltage applied thereto which is proportional to the difference [between the difference] between vehicle wheel speed and the vehicle speed, decreased by the tolerated slip. Voltage divider 206, 207 thus sets a threshold value. When the difference applied to the non-inverting input of the operational amplifier is below the threshold value, operational amplifier 200 provides a 0-signal.

The tap voltage derived from voltage divider 206, 207 can be so set that operational amplifier 200 provides a 0-signal only when, for example, vehicle wheel speed has dropped by a fixed value of, for example, 10 km/h (approximately 6 mph) below the vehicle wheel speed, as decreased by the tolerated slip. It is therefore possible to introduce, electrically, an additional slip by a fixed speed and a tolerated difference in speed. This is particularly desirable at low vehicle speeds, since control by slip alone based on percentages would provide for small speed differences between wheel and vehicle.

Transistor 210 in the second timing circuit 21 is conductive under ordinary or quiescent conditions of the circuit. It is fed base current over resistor 213 and diode 212. When the output voltage of threshold switch 20 changes to a 0-signal, then this change in voltage is transferred by capacitor 211 to the base of transistor 10 and the 0-signal blocks transistor 210. Transistor 220 in NOR-gate 22 then can receive current over resistors 215 and 222 to its base, so that it will become conductive and NOR-gate 22 provides a 0-signal which causes transistor 23 to become conductive. This is further described in connection with FIG. 4 below.

The transistor switch 23, now conductive, causes drop in braking pressure. The drop in braking pressure usually leads to a decrease in wheel slip so that the second threshold switch 20 very quickly will provide a 1-signal, causing transistor 210 in the second timing circuit 21 to again become conductive and terminating pressure relief. The entire pressure drop cycle, under ordinary conditions, has a duration of about 50 to 200 milliseconds.

It may occur that malfunction arises somewhere within the circuit, and that such malfunction leads to a 0-signal at the output of the second threshold switch 20. As an example, the tachometer generator 10 or the frequency-voltage converter 11 may be defective, or not provide an output signal. This would cause complete bleeding of brake pressure if the second timing circuit 21 were not provided. If, for example, the 0-signal at the output of the second threshold switch 20 would persist for a longer period of time, capacitor 211 would slowly charge over resistor 213 to such an extent that transistor 210 becomes conductive. In the example selected, resistor 213 is of such high value that the delay time of the second timing circuit 21 is roughly 400 milliseconds.

In a normal control cycle, the output of the second threshold switch 20 will revert to a 1-signal in advance of this time of 400 milliseconds. If, however, re-set of the second threshold switch 20 does not occur, then the drop in pressure is terminated in any event after 400 milliseconds.

The first timing circuit 14 is similar in operation and function to that described in connection with timing circuit 21. Let it be assumed that pressure is relieved by the deceleration sensing circuit. In any event, bleeding of brake pressure is terminated after 400 milliseconds, even if no re-set signal is provided, indicative that the wheel has decelerated only to a small value.

It would be equally possible to replace the two timing circuits 14, 21 by a single timing circuit and to control such a single timing circuit over an OR-gate from the two threshold switches 13, 20. For reliability, however, it is desirable to have two separate timing circuits for the two control circuits. It is also possible by suitable selection of values to then set the timing circuits of the two control circuits to be different, if this is desirable for specific vehicle constructions.

Figure 3:
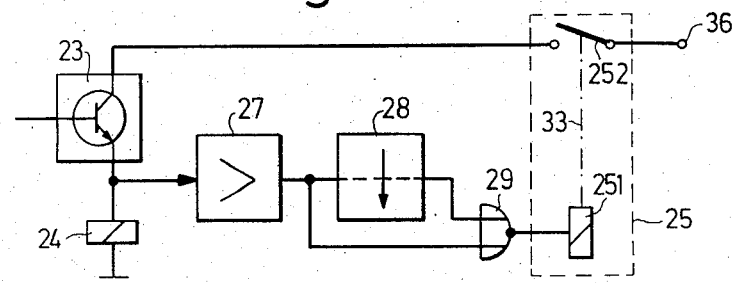
FIG. 3 is a fragmentary schematic diagram of a switching stage in the circuit.
Figure 4:
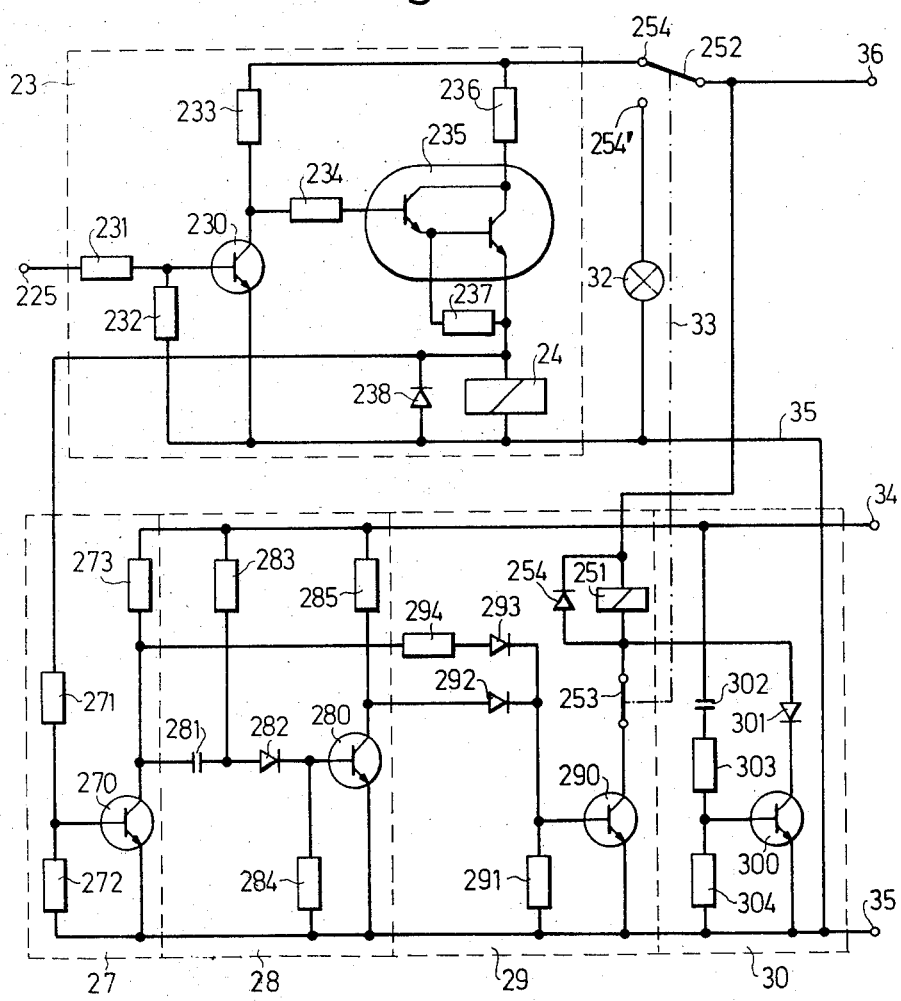
FIG. 4 is a schematic diagram of the switching stage of FIG. 3.

The turn-off stage 26 is described in connection with FIG. 3: An inverter stage 27 is connected to the junction point between the transistor 23 and solenoid 24. Inverter 27, preferably an inverter amplifier is connected to a third timing circuit 28. The outputs of the inverter 27 and the third timing circuit 28 are connected to the inputs of a second NOR-gate 29 having its output connected to control current through a relay coil 251 of relay 25. Relay coil 251 operates — as shown in the dashed line 33 — switch 255 which is connected between positive power supply 36 and the collector terminal of transistor switch 23. The detailed circuit as shown in FIG. 4, which further illustrates a relay switch 30. Transistor switch 23, at the input side, includes an npn transistor 230 having a collector resistor 233 and connected to a fixed contact 254 of switch 252. The base of transistor 230 is connected over resistor 232 with negative bus 35. It is further connected over input resistor 231 with the output circuit 225 of the first NOR-gate 22 (FIGS. 1, 2).

The collector of transistor 230 is connected over resistor 234 to the input of a Darlington circuit 235 which includes the two npn transistors in a single housing. The collector terminal of the Darlington circuit 235 is connected over resistor 236 with the fixed switch contact 254. The emitter electrodes of the two transistors of the Darlington circuit are connected together over resistor 237 which connects to the solenoid 24, the other terminal of which is connected to negative bus 35. A free-wheeling diode 238 is connected in parallel to the solenoid 24.

The movable contact of switch 252 is directly connected to positive power supply 36. Switch 252 is a transfer switch (SPDT) and has a second fixed contact 254', which connects to a warning lamp 32, the other terminal of which is connected to ground at 35. The inverter amplifier 27 includes an npn transistor 270 having its collector connected over resistor 273 to the stabilized positive supply 34. A resistor 271 connects the base of transistor 270 with the junction between the emitter connection of the Darlington circuit 235 in stage 23 and the solenoid 24. A base resistor 272 connects to the chassis bus 35, the connection to the solenoid being over coupling resistor 271.

The third timing circuit 28 is similar to that of the second timing circuit 21 (FIG. 2) and the same reference numerals have been used, incremented with respect to the second timing circuit 21 by 70. Detailed description is therefore unnecessary.

The second NOR-gate 29 includes a transistor 290 having its emitter connected directly to negative line 35. The base of transistor 290 is connected over diode 292 with the collector of the transistor 280 and, over the series circuit of a diode 293 and a resistor 294, with the collector of transistor 270. The series circuit of a relay winding 251 and a working contact 253, coupled with contact 254 is connected in the collector of transistor 290, to connect the collector to positive supply 36. The coil of relay 251 is bridged by a free-wheeling diode 254.

The relay control circuit 30 includes an npn transistor 300 having its collector connected over a diode 301 to the junction between the relay winding 251 and the switch contact 253. The base of transistor 300 is connected across stabilized supply 34, 35 by being connected to the junction of a series circuit formed of capacitor 302 and resistor 303, on the other hand, and a resistor 304 connected to chassis 35. Transistor switch 23 is blocked when its input has a 1-signal applied thereto, since transistor 230 is held conductive over its input resistor 231, which applies base current. Its collector is thus effectively at ground potential, and Darlington circuit 235 does not receive base current. If, however, NOR-gate 22 provides a 0-signal, transistor 230 will block, Darlington circuit 235 will receive base current over resistors 233, 234 and winding 24 will have current supplied thereto over resistor 237 and the conductive Darlington circuit 235. Solenoid 24 is energized, and pressure in the brake lines will drop. The free-wheeling diode 238 continues to conduct inductive current after the Darlington circuit 235 has again blocked.

The stages 27 to 30 monitor operation of the transistor switch 23. Malfunction in switch 23 is particularly dangerous because no further correction can be obtained by the timing circuits 14, 21. For example, if the Darlington circuit 235 is overloaded so that one of its transistors fuses, the circuit 235 will then continuously conduct current causing solenoid 24 to be continuously energized and interrupting pressure to the respective brake line. It is no longer possible to effect braking by such a wheel. Correction of such malfunction, and fail-safe operation will be described in connection with stages 27 to 30.

Operation of fail-safe circuit: Let is be assumed that the vehicle, with the wheel anti-lock system is being started. As power supply is switched on, a positive voltage pulse will be applied to capacitor 302 which will be transmitted to the base of transistor 300 in the relay circuit of stage 30. Transistor 300 which, in ordinary condition is blocked, will become conductive for a short period, so that current can flow over diode 301 and relay winding 251 through the transistor 300. The relay 251 will pull in and connect the switches 253, 254 to assume the position shown in FIG. 4. The collector terminal of Darlington circuit 235 as well as the collector of transistor 290 are connected with positive supply 36.

Let it be assumed that the vehicle operates without braking. Transistor 270 in the inverter stage 27 is blocked since its base is at ground potential, connected over two resistors 271, 272. Due to the blocked transistor 270, transistor 290 in the second NOR-gate 29 receives base current over resistors 273, 294, and diode 293, and NOR-gate 29 becomes conductive and maintains current over relay winding 251, even upon blocking of transistor 300 after charging of capacitor 302 in the opposite direction. The two switches 252, 253 will remain in the position shown in FIG. 4.

Upon braking which causes the deceleration control circuit, or the slip control circuit to respond, Darlington circuit 235 in the transistor switch 23 becomes conductive, transistor 270 receives base current over its resistor 271 and likewise becomes conductive. Its collector changes from a 1-signal to a 0-signal. In stationary condition of the circuit, the transistor 280 in the third timing circuit 28 is conductive and provides a 0-signal at its collector. Upon change of the output signal in the inverter stage from 1 to 0, a negative voltage peak is transferred by capacitor 281 to the base of transistor 280, which will block, and provide a 1-signal at its collector. The transistor 290 in the second NOR-gate 29 therefore continues to remain conductive. It receives base current now over diode 292 rather than over diode 293 as before. Capacitor 281 and resistor 283 in the third timing circuit 28 are so relatively dimensioned that the transistor 280 becomes conductive after a delay time from between 500 milliseconds to 1 second. As above referred to, pressure drop cycles are usually substantially shorter. Under ordinary condition, therefore, the transistor 290 remains conductive constantly since the transistor 270 reverts into its blocked condition before transistor 280 becomes conductive, thus applying base current to transistor 290 again over diode 293.

Let it be assumed that transistor switch 23 is subject to malfunction, so that the Darlington circuit 235 is continuously conductive. Transistor 290 in the second NOR-gate 29 will block after the time delay of the third timing circuit (½ to 1 second) since it will no longer receive base current. Transistor 300 in the monitoring stage 30 has long since reverted to its blocked condition and relay 251 will no longer receive supply current and the relay will drop off. Switch 253 opens, and switch 252 transfers. The collector connection of the Darlington circuit 235 and the collector of transistor 290 are now severed from supply 36. The solenoid 24 of the pressure relief valve is severed from connection and braking pressure can no longer be dropped. At the same time, due to transfer of switch 252 to terminal 254', the warning signal lamp 32 is energized indicating that malfunction in the anti-lock system obtains. The lamp may, of course, be replaced by any other suitable alarm, such as an audible alarm, providing in any event an indication of malfunction to the operator.

Figure 4A:
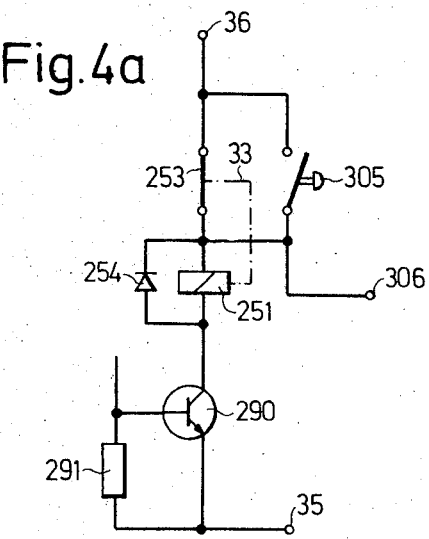
FIGS. 4a and 4b are simplified embodiments of portions of the switching stage of FIG. 3.
Figure 4B:
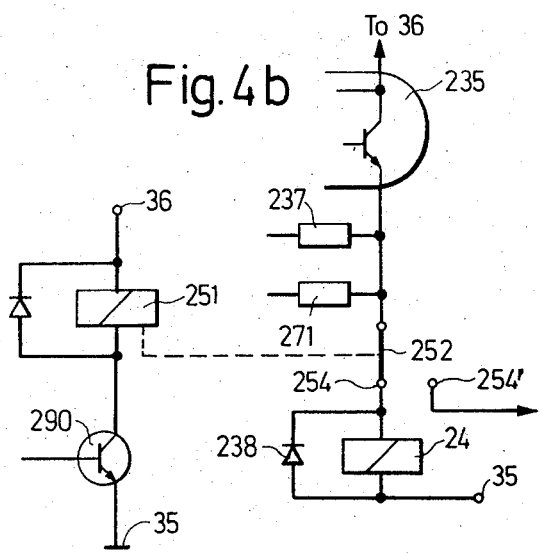

The switch-off stage 26 can be replaced by a simpler circuit as illustrated in FIGS. 4a, 4b. Neither circuit requires the separate turn-on stage 30, in all other respects the circuits are identical to those shown in FIG. 4.

FIG. 4a: Relay 251 and its free-wheeling diode 254 are connected directly to the collector of transistor 290. The series connected switch 253 is connected to the positive supply 36. A terminal of starter switch 305 is connected in parallel to the switch 253, starter switch 305 over terminal 306 further energizing the starter, or the starter relay.

Operation: Upon starting of the vehicle with the circuit of FIG. 4a, buses 34, 36 are energized upon turning of the ignition switch. This causes, initially, blocking of transistor 270 and conduction of transistor 290 (see FIG. 4). Switch 253 is, however, still open. Upon operation of the starter switch 305, positive bus 36 energizes, over the starter switch, relay 251 to provide current therethrough through the conductive transistor 290. Relay 251 closes switch 253, which is connected in a self-holding circuit. The connection between starter switch 305 and the relay 251 thus replaces the separate turn-on stage 30.

Circuit of FIG. 4b: Switch 253 is omitted from the circuit 29 (FIG. 4a) so that the collector of transistor 290 is connected directly to the relay 251. Switch 252 is then not connected as in FIG. 4, between positive bus 36 and resistor 236, but rather between the emitter connection of the Darlington circuit 235 and solenoid 24. The resistor 271 in the inverter stage 27 is connected to the emitter of the Darlington circuit 235 as before.

Operation of circuit of FIG. 4b: Switch 252 is constantly closed during operation of the vehicle, so long as transistor 290 is conductive. If, for example, a short circuit arises within the Darlington circuit 235, causing energization of solenoid 24 for a period which is longer than that of the timing period of stage 29, for example longer than ½ second, transistor 290 will block since both transistors 270, 280 become conductive. This causes de-energization of coil 251 of relay 25, which opens switch 252. Since there is a short circuit within the Darlington circuit 253, transistor 270 however remains conductive since it will receive base current over resistor 271 directly from the positive supply 36 through the now assumed short circuited, defective Darlington circuit 235.

The anti-lock system of the present invention substantially increases the reliability and safety of any such system. Initially, two separate control loops are provided, one for wheel deceleration and one for differential wheel speed and vehicle speed, or wheel slip. Both control circuits control the transistor switch 23. If one of the control circuits malfunctions, the other control circuit still remains operative. Each one of the control circuits has a timing circuit 14, 21 which, after spurious triggering or for other reasons of malfunction, interrupts the output signal from the respective control circuit. If malfunction arises within the transistor switch itself, the separate turn-off stage 26 with the controls 27–30 are provided, in a fail-safe circuit, to interrupt supply to the transistor switch at least until the supply voltage is completely disconnected (turning off of the ignition switch) and then re-connected. A warning lamp is provided which lights when the transistor switch is disabled, indicating, when the ignition switch is first turned on, that the apparatus is properly functioning and, during operation, if malfunction arises.

The turn-off stage 26 can be used with vehicle anti-lock systems which do not have separate control circuits for vehicle wheel acceleration and for relative vehicle speed and wheel speed; various combinations of the various features may be made with the features described within the present invention, as well as with known brake anti-lock systems.

The present invention has been described wholly with respect to a wheel anti-lock system. As will be apparent, it is equally applicable to wheel slip systems to prevent spinning of wheels, when excessive tractive effort is applied, for example to control driving power applied to the driving wheels of a locomotive, the only change necessary being setting of the threshold switch for wheel acceleration, rather than deceleration, and setting of the circumferential wheel spaced comparator and vehicle speed comparator 15 to compare lower vehicle speed with higher wheel speed, rather than the reverse, as described, considering that deceleration, as referred to, is the mathematical inverse of acceleration.

Various changes and modifications may be made within the inventive concept.

We claim:

1. In a vehicle wheel anti-lock system in which fluid pressure applied to a vehicle wheel brake is relieved, having a solenoid (24) to operate a bleed valve, and means (10, 11) providing a signal representative of wheel speed;

differentiating means (12) delivering a differentiated derivative signal representative of rate of change of wheel speed;

threshold switch means (13) having the differentiated speed signal applied thereto and providing a pressure relief control signal to the solenoid when the differentiated signal exceeds a predetermined limit;

valve switching means (23) responsive to the pressure relief control signal to control energization of the bleed valve solenoid;

a first timing circuit means (14, 21) interposed between the threshold switch means (13) and the bleed valve switching means (23) and energized upon beginning of the pressure relief signal to start measuring a predetermined time interval and to conduct said pressure relief signal to the bleed valve switching means (23) during said time interval only to permit response of the solenoid coil to relieve brake pressure, said timing circuit means (13), after said predetermined time interval, interrupting application of said pressure relief signal to the valve switching means (23) regardless of persistence or non-persistence of the pressure relief signal, whereby control of relief of braking pressure by said pressure relief signal is limited to said time interval, and the time of relief of fluid pressure applied to the brake is always limited to said predetermined time interval;

and an additional turn-off circuit (26) including a turn-off relay (25, 251) connected between the power supply (35, 36) and said bleed valve solenoid (24) to interrupt current to the solenoid upon response of said turn-off circuit when energized, said turn-off circuit comprising a solenoid condition sensing circuit (27) connected to provide a signal when current flows through the solenoid to operate said solenoid;

a turn-off timing circuit (28) having a second timing period longer than the timing period of the first timing circuit (14);

a logic gate (29) connected to the sensing circuit (27) and to the turn-off timing circuit (28) and providing an output upon logical conjunction of:
a. current flow to the solenoid, and
b. elapse of said second timing period, the output of said logic gate being connected to said turn-off control relay (25, 251) to interrupt power to the solenoid upon response of said logic circuit after elapse of the second timing period of said turn-off timing circuit (28).

2. System according to claim 1, wherein the solenoid condition sensing circuit (27) comprises an inverter amplifier (27) connected to the solenoid (24);

the logic gate is a NOR-gate (29);

the outputs of the inverter (27) and of the turn-off timing circuit (28) being connected in series to one input of the NOR-gate (29) and the output of the inverter circuit (27) being separately connected to another input of the NOR-gate (29);

the turn-off control relay (25, 251) having a relay winding (251) controlled by the output of said NOR-gatge (29) and having a relay switch element (252) connected between the power supply (35, 36) and said bleeder valve solenoid (24).

3. System according to claim 2, wherein the NOR-gate (29) comprises a transistor (290, said turn-off relay winding (251) being connected in series with the emitter-collector path of the transistor and between the power supply terminals to the system, and a switch (253) is included in said series circuit, said switch (253) being closed when said turn-off relay winding (251) is energized.

4. System according to claim 3, wherein a relay turn-on circuit (30) is provided comprising a transistor (300), a capacitor (302) connecting the base of the transistor to the supply terminal (34), the collector-emitter path of the transistor (300) being connected to energize the turn-off relay winding (251).

5. System according to claim 3, wherein the system includes (FIG. 4a): a starter switch (305), the switch (253) being connected to be shunted by the starter switch (305) when the starter switch is operated.

6. System according to claim 1, wherein the control relay has a relay switch element connected as a transfer switch having a movable contact connected to the power supply, a first fixed contact providing current to said valve switching means (23) and hence to the solenoid (24) connected to the movable contact when the relay has not responded under control of said logic gate (29), and a second fixed contact (254');

and a warning indicator (32) is provided, said warning indicator being connected to said second fixed contact (254') and providing a warning indication when the relay coil is energized and the switch contact transfers from the first fixed contact to the second fixed contact.

7. System according to claim 1, wherein said timing circuit means comprises first (14) and second (21) timing circuits;

the first timing circuit (14) being connected between the first switch means (13) and the valve switching means (23), said first timing circuit being energized upon the beginning of the first pressure relief control signal from said first threshold switch means (13) to start measuring a predetermined first time interval, and to conduct said first pressure relief control signal to the valve switching means (23) during said first time interval, said first timing circuit, after said first time interval, interrupting application of said first pressure relief signal to the valve switching means (23);

the second timing circuit (21) being connected between the second switch means (20) and the valve switching means (23), the second timing circuit being energized upon detection of a speed difference above said predetermined level by said second switch means (20) to start measuring a second predetermined timing interval and to conduct the second pressure relief signal from said second switch means (20) to the valve switching means (23) during said second timing interval, said second timing circuit (21), after said second timing interval, interrupting application of said second pressure relief signal from said second switch means (20) to the valve switching means (23) regardless of persistence, or resetting of the signal from said second switch means (20).

8. System according to claim 7, further comprising a disjunctive gate (22) having the output from the first and the second timing circuits (14, 21) applied thereto, the output of said gate (22) being connected to control said valve switching means (23).

9. System according to claim 1, further comprising a disjunctive gate (22) having the output from said first and second switch means (13, 20) connected to the inputs thereof;

the timing circuit means comprising a single timing circuit energized by said gate (22), the output of said timing circuit means controlling said switching valve means (23).

10. System according to claim 7, wherein at least one of the timing circuits (14, 21, 28) includes a transistor (210, 280) having its base so biassed that the transistor, under quiescent condition, is in conductive state;

and a capacitor (211, 281) connected in series with the base of the transistor (210, 280) to act as a timing element.

11. System according to claim 7, wherein the predetermined second time interval of the second timing circuit (21) and the first time interval of said first timing circuit (14) are about equal.

12. System according to claim 1, wherein the timing interval of said timing circuit means is set to be in excess of expected time of pressure relief under control of the respective pressure relief signal.

13. In a vehicle wheel anti-lock system in which fluid pressure applied to a vehicle wheel brake is relieved, and having a solenoid (24) to operate a bleed valve, and means (10, 11) providing a signal representative of wheel speed;

differentiating means (12) delivering a differentiated derivative signal representative of wheel rate of change of speed;

a first switch means (13) having the differentiated speed signal applied thereto and providing a first pressure relief control signal to the solenoid when the differentiated signal exceeds a predetermined limit;

a vehicle speed signal generating stage (15) generating a signal representative of vehicle speed;

a comparator (17, 19) having a wheel speed signal and the output from said vehicle speed generating stage applied thereto to provide an output signal representative of the difference between vehicle speed and circumferential wheel speed;

a second switch means (20) having said difference signal applied thereto and providing a second pressure relief signal when said difference exceeds a predetermined level;

valve switching means (23) responsive to the pressure relief control signals to control energization of the brake valve solenoid (24);

and wherein the comparator (19) comprises an inverter stage (17), two adder resistors (191, 192), one adder resistor (191) having the vehicle wheel speed signal applied thereto and the second adder resistor (192) being connected to the inverter stage (17) and having the inverse of the output from said vehicle speed signal generating stage (15) applied thereto.

14. System according to claim 13, wherein the vehicle speed signal generating stage comprises (FIG. 2): a storage capacitor (150), a group of diodes, one associated with each wheel of the vehicle, the speed signals derived from each respective wheel being connected to a respective diode (151–154), said speed signals being transferred to said storage capacitor over said diodes whereby said storage capacitor will be charged to a value representative of the highest speed derived from any one wheel.

15. System according to claim 14, further comprising a constant current source includng a transistor (155) connected parallel to the storage capacitor (150).

16. System according to claim 14, further comprising an inverter amplifier (17) connected to the vehicle speed signal generating stage, said inverting amplifier providing output to the comparators (19) associated with each wheel.

* * * * *